United States Patent
Funayama et al.

(10) Patent No.: US 12,283,131 B2
(45) Date of Patent: Apr. 22, 2025

(54) INFORMATION PRESENTING SYSTEM, INFORMATION PRESENTING METHOD, COMPUTER PROGRAM, AND AUTHENTICATION SYSTEM

(71) Applicant: NEC Corporation, Tokyo (JP)

(72) Inventors: Chisato Funayama, Tokyo (JP); Ryuichi Akashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 17/781,105

(22) PCT Filed: Dec. 4, 2019

(86) PCT No.: PCT/JP2019/047433
§ 371 (c)(1),
(2) Date: May 31, 2022

(87) PCT Pub. No.: WO2021/111548
PCT Pub. Date: Jun. 10, 2021

(65) Prior Publication Data
US 2022/0406095 A1    Dec. 22, 2022

(51) Int. Cl.
G06V 40/16    (2022.01)
G06V 40/18    (2022.01)
G06V 40/60    (2022.01)
G09F 19/18    (2006.01)

(52) U.S. Cl.
CPC ............ *G06V 40/67* (2022.01); *G06V 40/161* (2022.01); *G06V 40/193* (2022.01)

(58) Field of Classification Search
None
See application file for complete search history.

(56) References Cited

U.S. PATENT DOCUMENTS

2004/0252988 A1* 12/2004 Imaoka .................. G06V 40/19
396/18
2012/0320181 A1    12/2012 Hong et al.
2019/0089866 A1*  3/2019 Horishita ........... H04N 1/00251
(Continued)

FOREIGN PATENT DOCUMENTS

CN    105824421 A    8/2016
CN    105975933 A    9/2016
(Continued)

OTHER PUBLICATIONS

International Search Report for PCT Application No. PCT/JP2019/047433, mailed on Feb. 25, 2020.
(Continued)

*Primary Examiner* — Beniyam Menberu

(57) ABSTRACT

An information presenting system includes: a specification unit that specifies a position of a biological part used for authentication from information about a target person; a setting unit that sets an imaging area in which the biological part is imaged, in accordance with the specified position of the biological part; and a presentation unit that presents information indicating the imaging area at a position that allows an overlap of the biological part. According to this information presenting system, information about biometric authentication can be appropriately presented to the target person, so that an authentication process can be performed normally.

12 Claims, 14 Drawing Sheets

(56) References Cited

U.S. PATENT DOCUMENTS

| | | | |
|---|---|---|---|
| 2019/0236252 A1 | 8/2019 | Maeda et al. | |
| 2019/0243469 A1 | 8/2019 | Kuribayashi | |
| 2020/0129878 A1* | 4/2020 | Schwartz | ............. G06T 19/006 |

FOREIGN PATENT DOCUMENTS

| | | | | |
|---|---|---|---|---|
| CN | 211830836 | * | 10/2020 | ............. G06F 3/041 |
| JP | 2000-259817 A | | 9/2000 | |
| JP | 2004069497 | * | 3/2004 | ............. G01B 11/00 |
| JP | 2005192843 | * | 7/2005 | ............... G06T 1/00 |
| JP | 2007-209646 A | | 8/2007 | |
| JP | WO2009016846 | * | 10/2010 | ............. G06T 1/00 |
| JP | 2016197192 | * | 11/2016 | ............... G09G 5/00 |
| JP | 2017138846 | * | 8/2017 | ........... G06F 30/484 |
| JP | 2017-156468 A | | 9/2017 | |
| KR | 20110016654 | * | 2/2011 | ............. G09F 19/18 |
| WO | 2007/132500 A1 | | 11/2007 | |
| WO | 2009/016846 A1 | | 2/2009 | |
| WO | 2018/003861 A1 | | 1/2018 | |

OTHER PUBLICATIONS

Extended European Search Report for EP Application No. EP19954990.8 dated on Nov. 8, 2022.
EP Office Action for EP Application No. 19954990.8, mailed on Jan. 17, 2025.
IN Official Communication for IN Application No. 202247031365, mailed on Feb. 27, 2025 with English Translation.

* cited by examiner

INFORMATION PRESENTING SYSTEM, INFORMATION PRESENTING METHOD, COMPUTER PROGRAM, AND AUTHENTICATION SYSTEM

This application is a National Stage Entry of PCT/JP2019/047433 filed on Dec. 4, 2019, the contents of all of which are incorporated herein by reference, in their entirety.

TECHNICAL FIELD

This disclosure relates to an information presenting system, an information presenting method, a computer program, and an authentication system that presents information about biometric authentication.

BACKGROUND ART

A known system of this type guides a target person of biometric authentication to a position at which an authentication process can be normally performed. For example, Patent Literature 1 discloses a technique/technology of outputting guidance for guiding a user to a recognition effective area. Patent Literature 2 discloses a technique/technology of performing a display for guiding a subject into a focused range. Patent Literature 3 discloses a technique/technology of guiding an authenticating person by using an LED.

As another related art, for example, Patent Literature 4 discloses a technique/technology of displaying an image on a fog screen.

CITATION LIST

Patent Literature

Patent Literature 1: JP2000-259817A
Patent Literature 2: JP2007-209646A
Patent Literature 3: International Publication No. WO2009/016846
Patent Literature 4: International Publication No. WO2007/132500

SUMMARY

Technical Problem

When a moving subject is imaged and authenticated, since it is too late to focus on the subject when the subject comes into an imaging range, the following manner is sometimes used; namely, a desired area for imaging is focused on in advance and when the subject passes through the area, an image is captured. When the subject cannot recognize the image area, however, it is not easy to capture the subject in the imaging area, and there is a possibility that the authentication cannot be normally performed. In each cited document described above, there is room for improvement in accurately conveying information about the imaging area.

This disclosure has been made in view of the above problems, and it is an example object of this disclosure to provide an information presenting system, an information presenting method, and a computer program that are configured to appropriately present information about biometric authentication to a target person.

Solution to Problem

An information presenting system according to an example aspect of this disclosure includes: a specification unit that specifies a position of a biological part used for authentication from information about a target person; a setting unit that sets an imaging area in which the biological part is imaged, in accordance with the specified position of the biological part; and a presentation unit that presents information indicating the imaging area at a position that allows an overlap of the biological part.

An information presenting method according to an example aspect of this disclosure includes: specifying a position of a biological part used for authentication from information about a target person; setting an imaging area in which the biological part is imaged, in accordance with the specified position of the biological part; and presenting information indicating the imaging area at a position that allows an overlap of the biological part.

A computer program according to an example aspect of this disclosure operates a computer: to specify a position of a biological part used for authentication from information about a target person; to set an imaging area in which the biological part is imaged, in accordance with the specified position of the biological part; and to present information indicating the imaging area at a position that allows an overlap of the biological part.

An authentication system according to an example aspect of this disclosure includes: a specification unit that specifies a position of a biological part used for authentication from information about a target person; a setting unit that sets an imaging area in which the biological part is imaged, in accordance with the specified position of the biological part; a presentation unit that presents information indicating the imaging area at a position that allows an overlap of the biological part; an imaging unit that images the imaging area and obtains an image of the biological part; and an authentication unit that performs the authentication of the target person on the basis of the image of biological part.

Effect of the Invention

According to the information presenting system, the information presenting method, the computer program, and authentication system in the respective aspects described above, it is possible to appropriately present the information about the biometric authentication to the target person. Thus, for example, it is easy to normally perform the biometric authentication.

DESCRIPTION OF EXAMPLE EMBODIMENT

Hereinafter, an information presenting system, an information presenting method, a computer program, and an authentication system according to an example embodiment will be described with reference to the drawings.

<Information Presenting System>

A configuration of the information presenting system according to the example embodiment will be described with reference to FIG. 1 and FIG. 2.

(Functional Configuration)

First, a functional configuration of the information presenting system according to the example embodiment will be described with reference to FIG. 1. FIG. 1 is a block diagram illustrating the functional configuration of the information presenting system according to the example embodiment.

Figure 1:
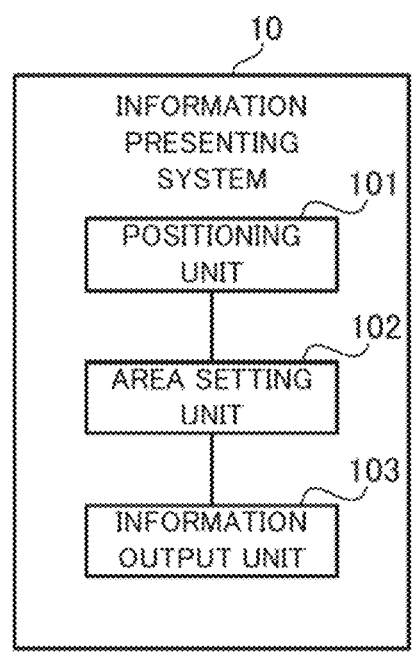
FIG. 1 is a block diagram illustrating a functional configuration of an information presenting system according to an example embodiment.

In FIG. 1, an information presenting system 10 is configured as a system that presents information about biometric authentication to a target person. The information presenting system 10 includes a position specifying unit 101, an area setting unit 102, and an information output unit 103, as processing blocks for realizing its function.

The position specifying unit 101 is configured to specify a position of a biological part used for the biometric authentication, on the basis of information about the target person (specifically, an image of the target person or the like). The position specifying unit 101 specifies the position of the biological part used for the authentication (e.g., a height, a lateral position, or the like), for example, from an image that contains a whole body of the target person. For example, when iris authentication is performed in an authentication system 1 described later, the position specifying unit 101 may specify the position of eyes of the target person. Incidentally, a detailed description of a specific method of specifying the position of the biological part will be omitted because it is possible to appropriately adopt the existing techniques/technologies.

The area setting unit 102 is configured to set an imaging area (in other words, an imaging point) of the image used for the biometric authentication on the basis of the position of the biological part specified by the position specifying unit 101. That is, the area setting unit 102 sets the imaging area corresponding to the specified position of the biological part such that the biological part of the target person can be appropriately imaged by an imaging apparatus 40 described later. For example, the area setting unit 102 sets the imaging area at a position that is higher than usual when the specified position of the biological part is relatively high, while the area setting unit 102 sets the imaging area at a position that is lower than usual when the specified position of the biological part is relatively low.

The information output unit 103 is configured to output information about the imaging area set by the area setting unit 102. The information about the imaging area includes at least information about the position of the imaging area. It may also include various informations to be conveyed to the target person (e.g., instruction contents in the biometric authentication, etc.). The information output unit 103 outputs the information about the imaging area to a display apparatus 30 and an imaging apparatus 40 described later.

(Hardware Configuration)

Next, a hardware configuration of the information presenting system 10 according to the example embodiment will be described with reference to FIG. 2. FIG. 2 is a block diagram illustrating the hardware configuration of the information presenting system according to the example embodiment.

Figure 2:
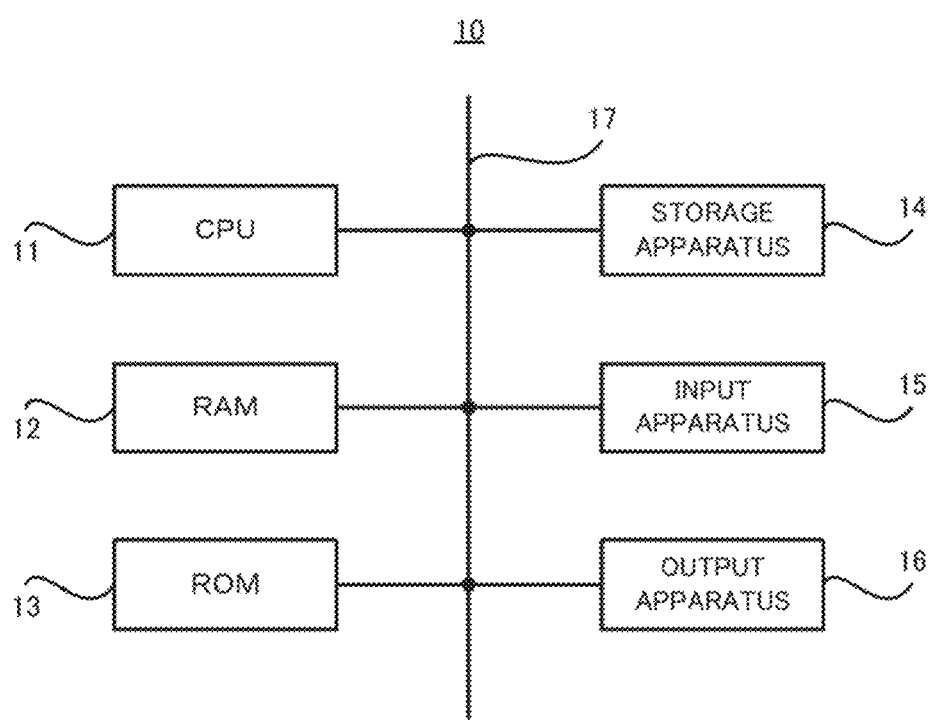
FIG. 2 is a block diagram illustrating a hardware configuration of an information presenting system according to the example embodiment.

As illustrated in FIG. 2, the information presenting system 10 according to the example embodiment includes a CPU (Central Processing Unit) 11, a RAM (Random Access Memory) 12, a ROM (Read Only Memory) 13, and a storage apparatus 14. The information presenting system 10 may also include an input apparatus 15 and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 is configured to read a computer program stored by at least one of the RAM 12, the ROM 13 and the storage apparatus 14. Alternatively, the CPU 11 may read a computer program stored by a computer readable recording medium by using a not-illustrated recording medium reading apparatus. The CPU 11 may obtain (i.e., read) a computer program from a not-illustrated apparatus that is located outside the information presenting system 10 through a network interface. The CPU 11 controls the RAM 12, the storage apparatus 14, the input apparatus 15, and the output apparatus 16 by executing the read computer program. Especially in the example embodiment, when the CPU 11 executes the read computer program, a functional block for presenting the information about the biometric authentication is implemented in the CPU 11.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer program to be executed by the CPU 11. The ROM 13 may otherwise store fixed data. The ROM 13 may be, for example, a P-ROM (Programmable ROM).

The storage apparatus 14 stores the data that is stored for a long term by the information presenting system 10. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the information presenting system 10. The input apparatus 15 may include, for example, at least one of a keyboard, a mouse, and a touch panel.

The output apparatus 16 is an apparatus that outputs information about the information presenting system 10 to the outside. For example, the output apparatus 16 may be a display apparatus (e.g., a display) that is configured to display the information about the information presenting system 10.

<Authentication System>

Next, an authentication system including the information presenting system 10 described above will be described with reference to FIG. 3 to FIG. 14.

(System Configuration)

Figure 3:
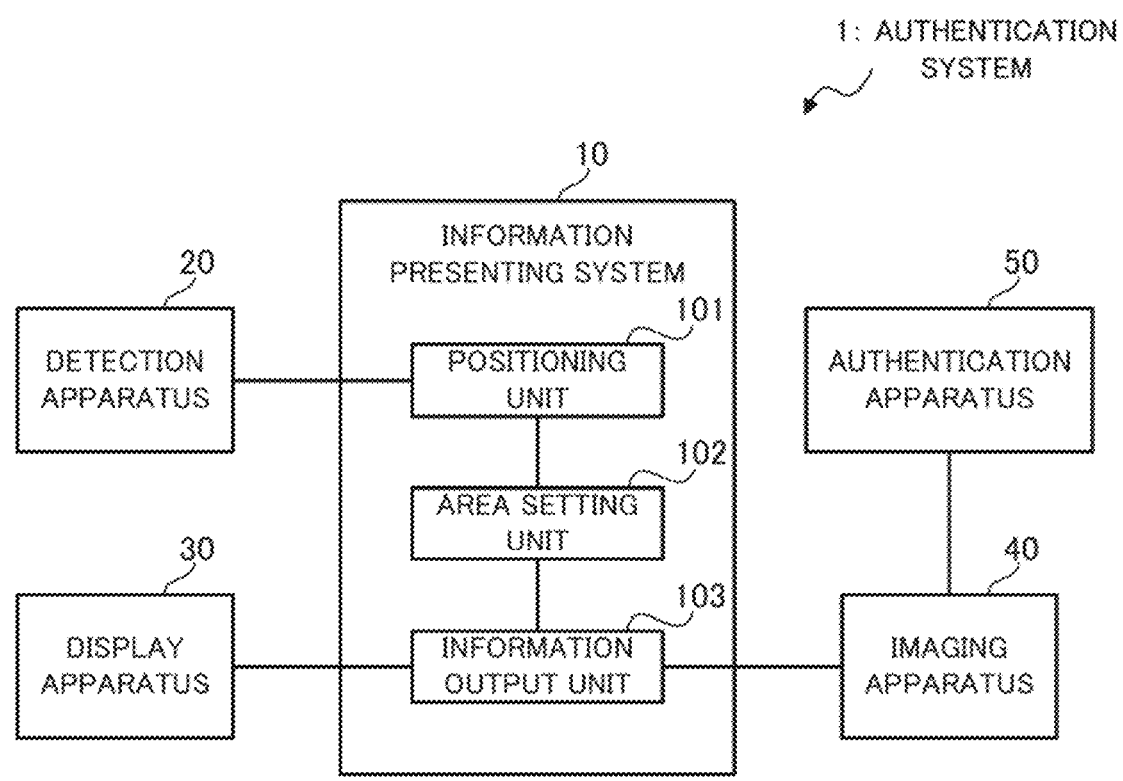
FIG. 3 is a block diagram illustrating an overall configuration of an authentication system according to the example embodiment.

First, with reference to FIG. 3, an overall configuration of the authentication system according to the example embodiment will be described. FIG. 3 is a block diagram illustrating the overall configuration of the authentication system according to the example embodiment.

In FIG. 3, an authentication system 1 according to the example embodiment is configured as a system that performs an authentication process (so-called biometric authentication) using the image of the biological part of the target person. The authentication system 1 includes the information presenting system 10 already described (see FIG. 1), a detection apparatus 20, a display apparatus 30, an imaging apparatus 40, and an authentication apparatus 50.

The detection apparatus 20 includes, for example, a camera, and is configured to detect the information about the target person of the biometric authentication. Furthermore, the detection apparatus 20 includes, for example, a camera, and is located at a position at which the biological part used for the biometric authentication can be imaged. Alternatively, the detection apparatus 20 may be configured as various sensors other than the camera as long as it is possible to specify the position of the biological part of the target person. The information detected by the detection apparatus 20 is configured to be outputted to the position specifying unit 101 of the information presenting system 10.

The display apparatus 30 is configured to present the position of the imaging area to the target person by displaying the information about the imaging area outputted from the information output unit 103. Furthermore, the display apparatus 30 according to the example embodiment is especially configured to display the information about the imaging area at a position that allows an overlap of the target person. Incidentally, the display apparatus 30 is preferably configured to display the information on a medium through which the target person can pass. The display apparatus 30 includes, for example, a projection apparatus and a fog generating apparatus that generates a fog display on which a light from the projection apparatus can be projected, and the display apparatus 30 projects the information about the imaging area on the fog display. A specific example of display by the display apparatus 30 will be described in detail later.

The imaging apparatus 40 is configured to image the target person (especially, the biological part used in the authentication) and to obtain an image used for the biometric authentication). The imaging apparatus 40 is configured, for example, as an iris camera that images an iris of the target person. Furthermore, especially in the imaging apparatus 40 according to the example embodiment, the imaging area is variable in accordance with settings of the area setting unit 102. For example, the imaging apparatus 40 includes a plurality of cameras that have different imaging areas, and selects a camera to be used for the imaging in accordance with the settings of the area setting unit 102. The imaging apparatus 40 changes the imaging area on the basis of the information about the imaging area outputted from the information output unit 103. An image captured by the imaging apparatus 40 is configured to be outputted to the authentication apparatus 50.

The authentication apparatus 50 performs the biometric authentication of the target person on the basis of the image captured by the imaging apparatus 40. The authentication apparatus 50 is configured, for example, to perform iris authentication using the image of the iris of the target person. The authentication process performed by the authentication apparatus 50 may be any one that uses the biological part of the target person, and the type thereof is not particularly limited. Incidentally, a detailed description of specific processing contents of the authentication process performed by the authentication apparatus 50 will be omitted because it is possible to appropriately adopt the existing techniques/technologies.

(Flow of Operation)

Figure 4:
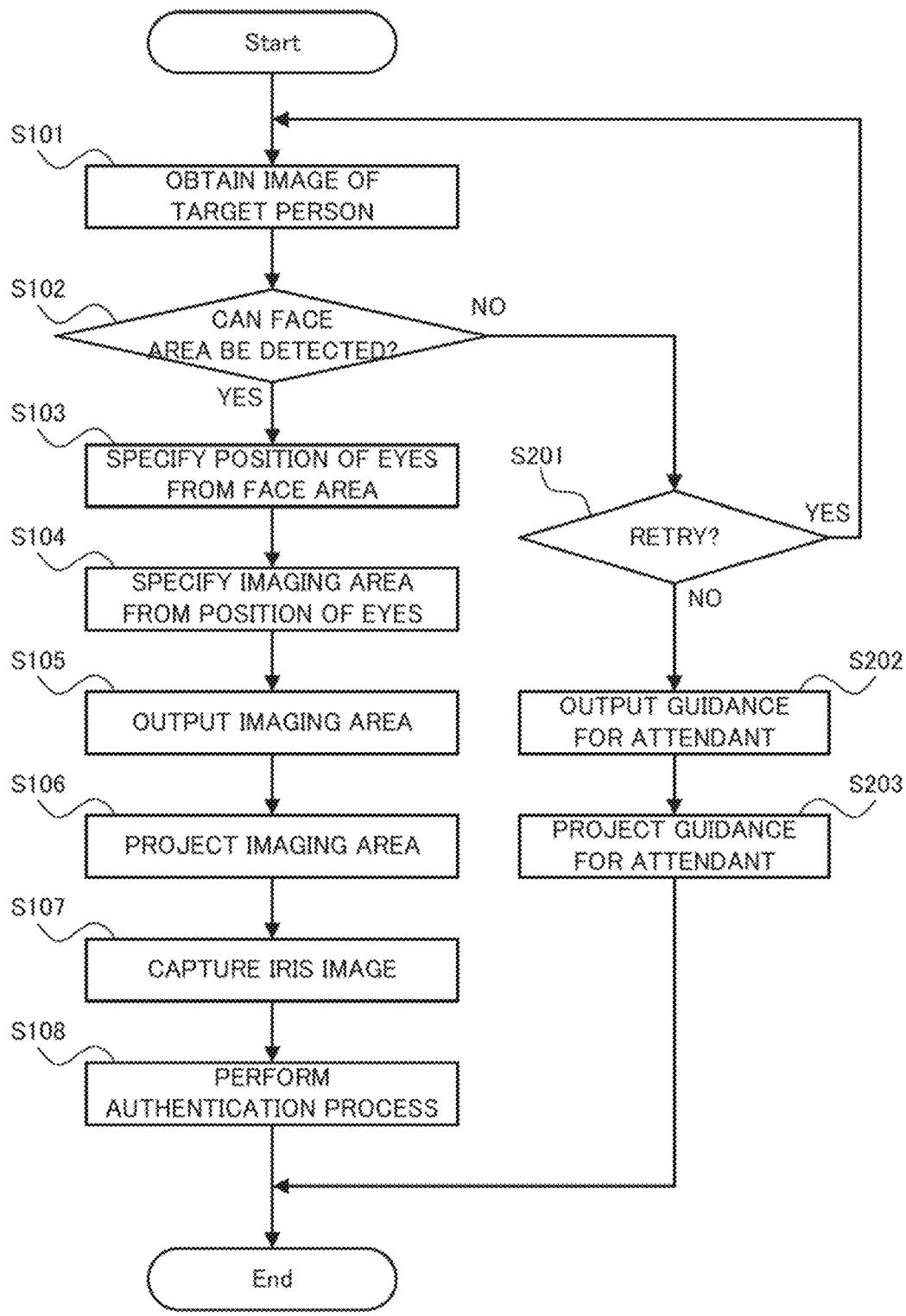
FIG. 4 is a flowchart illustrating a flow of operation of the authentication system according to the example embodiment.

Next, with reference to FIG. 4, a flow of operation of the authentication system 1 according to the example embodiment will be described. FIG. 4 is a flow chart illustrating a flow of the operation of the authentication system according to the example embodiment. The following describes an example in which the authentication system 1 detects the position of eyes from the image of the target person and performs the iris authentication.

As illustrated in FIG. 4, in operation of the authentication system 1 according to the example embodiment, firstly, the detection apparatus 20 obtains the image of the target person who is subjected to the authentication process (step S101). Subsequently, the position specifying unit 101 determines whether or not a face area of the target person can be detected from the image obtained by the detection apparatus 20 (step S102). Incidentally, the "detection of the face area" here is performed to specify the position of the eyes of the target person. A detailed description of a method of detecting the face area here shall be omitted because it is possible to appropriately adopt the existing techniques/technologies.

When it is determined that the face area cannot be detected (the step S102: NO), the position specifying unit 101 determines whether or not to retry the detection of the face area (step S201). Then, when it is determined to retry (the step S201: YES), the process is performed from the step S101 again. On the other hand, when it is determined not to retry (the step S201: NO), the information output unit 103 outputs information about a guidance for an attendant (e.g., a staff of a facility in which the authentication system 1 is provided, etc.). (step S202). This allows the display apparatus 30 to project an image that guides the target person to the attendant (steps S203). In this case, the biometric authentication by the authentication system 1 is not performed, and an authentication operation by the staff is performed separately.

On the other hand, when it is determined that the face area can be detected (the step S102: YES), the position specifying unit 101 detects the face area from the image of the target person and specifies the position of the eyes included in that face area (step S103). The position of the eyes can be specified, for example, by using a relationship between the position of the eyes and the face area stored in advance. Subsequently, the area setting unit 102 sets the imaging area in accordance with the specified position of the eyes (step S104). Then, the information output unit 103 outputs the information about the imaging area to each of the display apparatus 30 and imaging apparatus 40 (step S105).

The display apparatus 30 that has received the information about the imaging area, presents the information about the imaging area of imaging apparatus 40 to the target person (step S106). For example, the display apparatus 30 displays information indicating a specific position of the image imaging area in which an iris image is captured. This allows the target person to know where the imaging area of the imaging apparatus 40 is (in other words, where an image for authentication is captured). It is thus possible to guide target person toward the imaging area.

The imaging apparatus 40 then captures the iris image of the target person with a camera corresponding to the set imaging area (step S107). The imaging apparatus 40 captures the iris image, for example, for a predetermined time after the start of a display related to the imaging area by the display apparatus 30. Alternatively, the imaging apparatus 40 may capture the image the iris image when it is detected by various sensors or the like that the target person arrives at a predetermined position. When the iris image is captured, the authentication apparatus 50 uses the image and performs the authentication process (i.e., iris authentication) (step S108).

(Specific Example of Operation)

Figure 5:
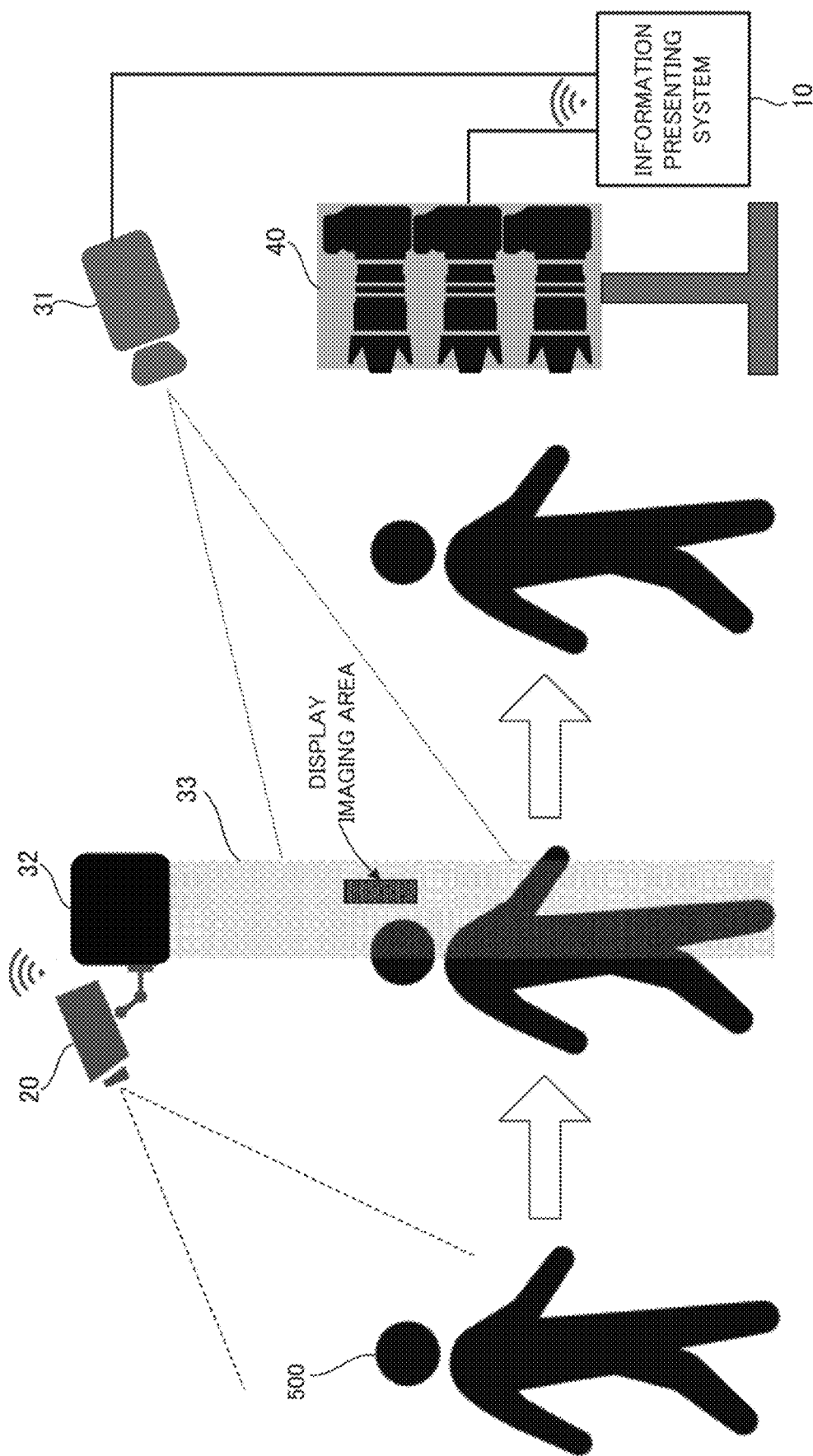
FIG. 5 is an image diagram illustrating an example of the operation of the authentication system according to the example embodiment.
Figure 6:
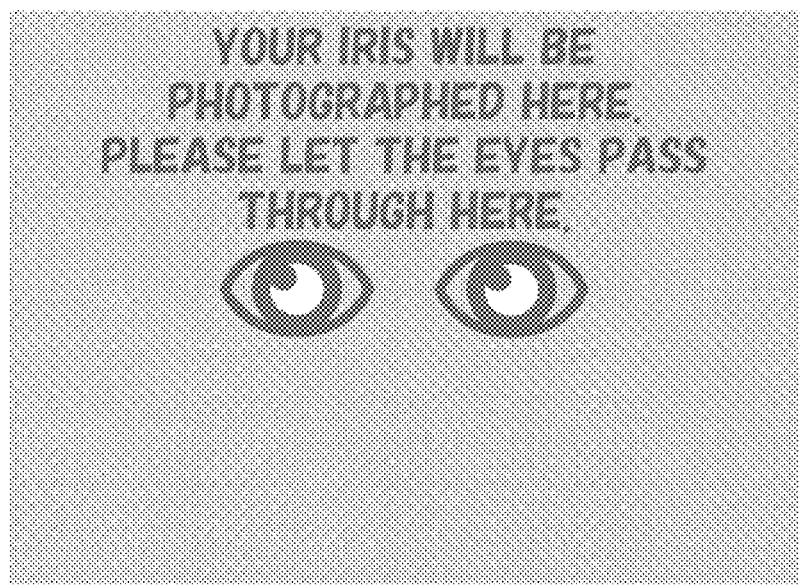
FIG. 6 is an image diagram illustrating an eye mark as an example of presentation of an imaging area.
Figure 7:
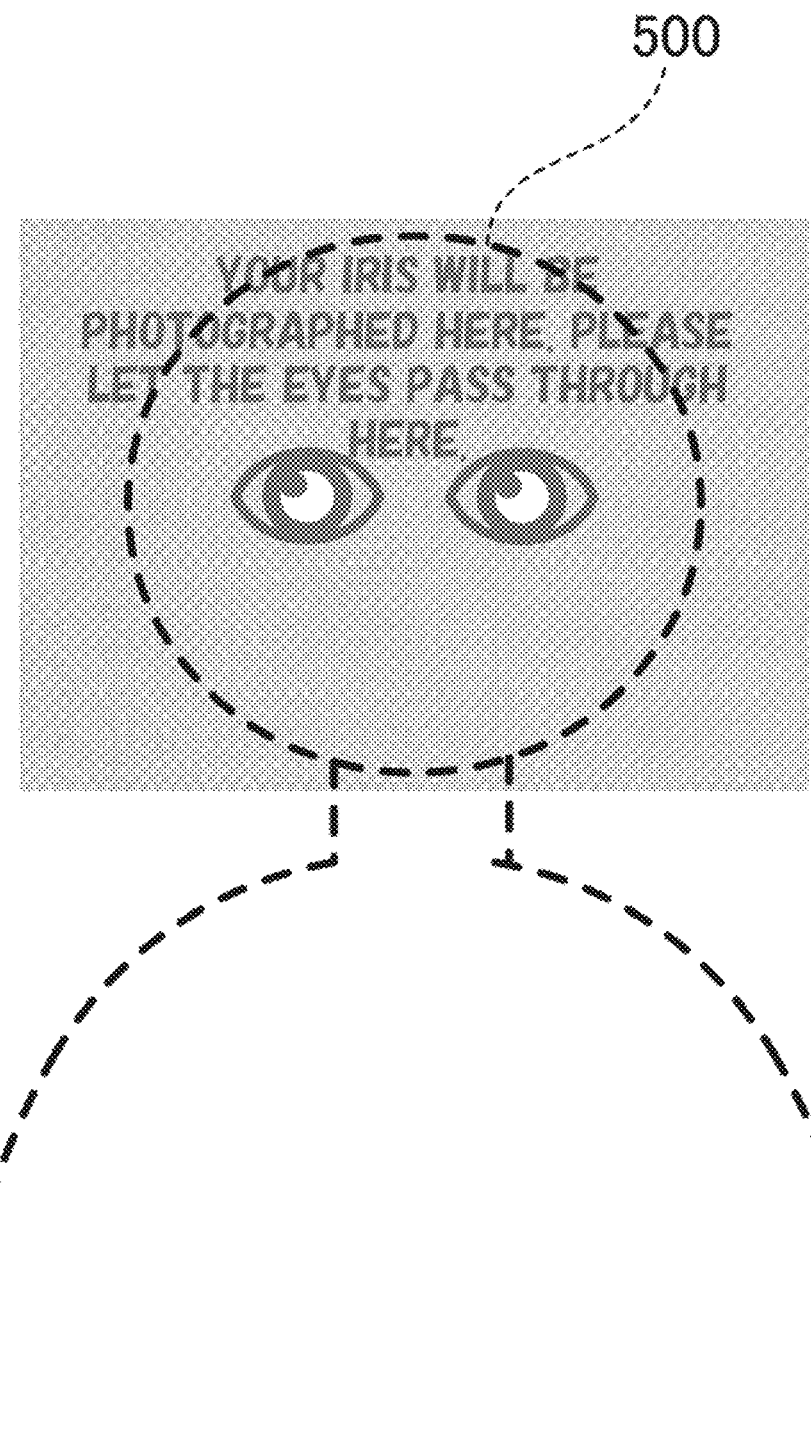
FIG. 7 is an image diagram illustrating an overlap between an imaging area display and a target person.

Next, with reference to FIG. 5 to FIG. 7, an example of the operation of the authentication system 1 according to the example embodiment will be specifically described. FIG. 5 is an image diagram illustrating the example of the operation of the authentication system according to the example embodiment. FIG. 6 is an image diagram illustrating an eye mark as an example of presentation of the imaging area. FIG. 7 is an image diagram illustrating an overlap between an imaging area display and the target person.

As illustrated in FIG. 5, the display apparatus 30 here is configured to include a projection apparatus 31 and a fog generating apparatus 32. The projection apparatus 31 is configured to display an image, as appropriate, on a fog display 33 generated by the fog generating apparatus 32. Incidentally, the fog generating apparatus 32 is placed to be able to generate the fog display 33 on a moving path of a target person 500 of the authentication process (e.g., near an entrance gate of a facility, etc.). The fog display 33 allows the target person 500 to pass through. Incidentally, the fog generating apparatus 32 includes the detection apparatus 20 to capture an image of the target person 500 who approaches the fog display 33. Furthermore, the imaging apparatus 40 is provided after the fog display 33 is passed through, and is configured to capture an image (here, iris image) of the target person 500 immediately after passing through the fog display 33. The imaging apparatus 40 includes three cameras with differing heights of the imaging area. Each of the detection apparatus 20, the projection apparatus 31, and the imaging apparatus 40 is wired or wirelessly communicable with the information presenting system 10.

In operation of the authentication system 1 illustrated in FIG. 5, firstly, the detection apparatus 20 captures an image of the target person 500 who approaches the fog display 33 (e.g., an image including a face of the target person 500). This image is transmitted to the information presenting system 10.

Subsequently, the information presenting system 10 detects the face area from the image of the target person 500 and specifies the position of eyes of the target person 500. The information presenting system 10 determines the position of the eyes of the target person 500, for example, in three stages of "high", "normal", and "low". Then, the information presenting system 10 sets the imaging area in accordance with the specified position of the eyes. Specifically, when the position of the eyes is determined to be "high", a camera that uses the highest position as the imaging area is selected, and setting is made to capture the iris image of the target person 500 with the selected camera. When the position of the eyes is determined to be "normal", a camera that uses the second highest position as the imaging area is selected, and setting is made to capture the iris image of the target person 500 with the selected camera. When the position of the eyes is determined to be "low", a camera that uses the lowest position as the imaging area is selected, and setting is made to capture the iris image of the target person 500 with the selected camera.

On the other hand, the projection apparatus 31 projects the information about the imaging area in a part corresponding to the imaging area set in the fog display 33. That is, the projection apparatus 31 projects the information about the imaging area at a position corresponding to the imaging area of the selected camera. Specifically, when the camera that uses the highest position as the imaging area is selected, the information about the imaging area is projected in a first position of the fog display, which is relatively high. When the camera that uses the second highest position as the imaging area is selected, the information about the imaging area is projected in a second position of the fog display, which is relatively near the center. When the camera that uses the lowest position as the imaging area is selected, the information about the imaging area is projected in a third position of the fog display, which is relatively low. This allows the target person 500 to know specifically in which part the imaging area is, depending on the position (here, height) of the display related to the imaging area.

In the above description, the imaging area can be projected in the three-stage positions, which are the first to third positions; however, the projected position may be appropriately set. That is, the position in which the imaging area is displayed may be determined in accordance with a body type, height, or position of the eyes of the target person 500 as long as the position allows a camera to capture an image.

In the above-described example embodiment, the imaging area is changed by selecting one camera from the three cameras, but the imaging area may be changed by another method. For example, a partial area may be extracted from an imagable area of the camera, and a process of imaging only in the area (so-called ROI: Region Of Interest) may be performed. In this situation, the position of the imaging area can also be changed, vertically or horizontally, in 1-pixel units. Imaging only the partial area with ROI can reduce a processing load while obtaining a high-definition image. Therefore, it is possible to realize a real-time authentication process while ensuring an amount of information required for the iris authentication.

As illustrated in FIG. 6, the information about the imaging area is displayed including characters and images. In an example of the display illustrated in FIG. 6, an eye mark is displayed, and an instruction to let the eyes pass through the position of the eye mark is displayed. The target person 500 who sees such a display moves to match the position of his or her eyes with the position of the eye mark if the position of the eyes is out of the imaging area of the imaging apparatus 40. As described above, if the information about the imaging area is displayed at a position that allows an overlap of the target person 500, it is possible to guide the target person 500 to an appropriate position (i.e., a position at which the iris image can be captured normally).

As illustrated in FIG. 7, as a consequence of the target person 500 being guided, the position of the eyes of the target person 500 falls within the imaging area of the imaging apparatus 40. Therefore, by performing the imaging by the imaging apparatus 40 immediately after the target person 500 passes through the fog display 33, it is possible to obtain the iris image suitable for the authentication process. Incidentally, the information about the imaging area is displayed in the vicinity of a focus position of the imaging apparatus 40 (e.g., a distance between the imaging apparatus 40 and the fog display 33 is adjusted in advance). Preferably, the imaging apparatus 40 and the fog generating apparatus 32 are placed such that the focus position of the imaging apparatus 40 is a position immediately after the target person 500 has passed through the fog display 33. Therefore, even when the target person 500 captures images while moving as described above, it is possible to obtain an appropriate iris image.

The example of the presentation of the information about the imaging area is not limited to the eye mark as illustrated in FIG. 6 and FIG. 7. Referring now to FIG. 8 to FIG. 14, variations of examples of the presentation of the information about the imaging area will be described below.

Figure 8:
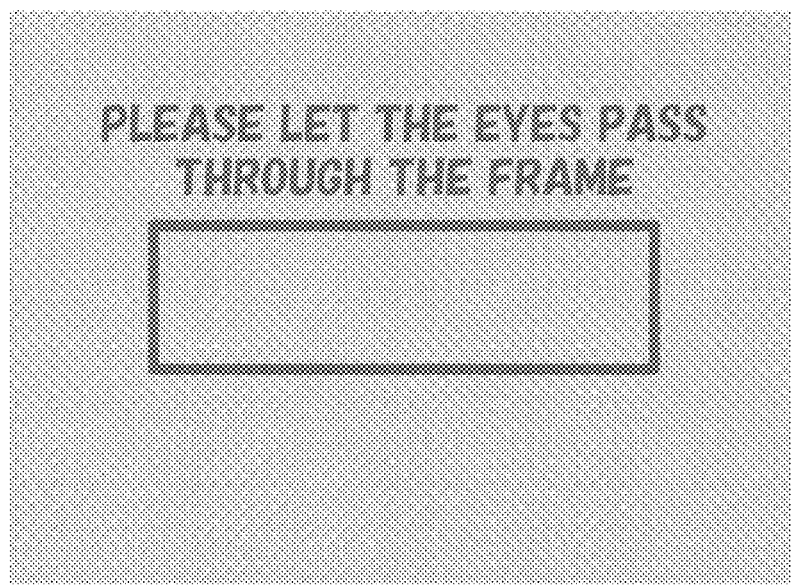
FIG. 8 is an image diagram illustrating a rectangular frame as an example of the presentation of the imaging area.

FIG. 8 is an image diagram illustrating a rectangular frame as an example of the presentation of the imaging area. As described above, even when a rectangular frame is illustrated instead of the eyes mark, the target person 500 can know where to let the eyes pass through.

Figure 9:
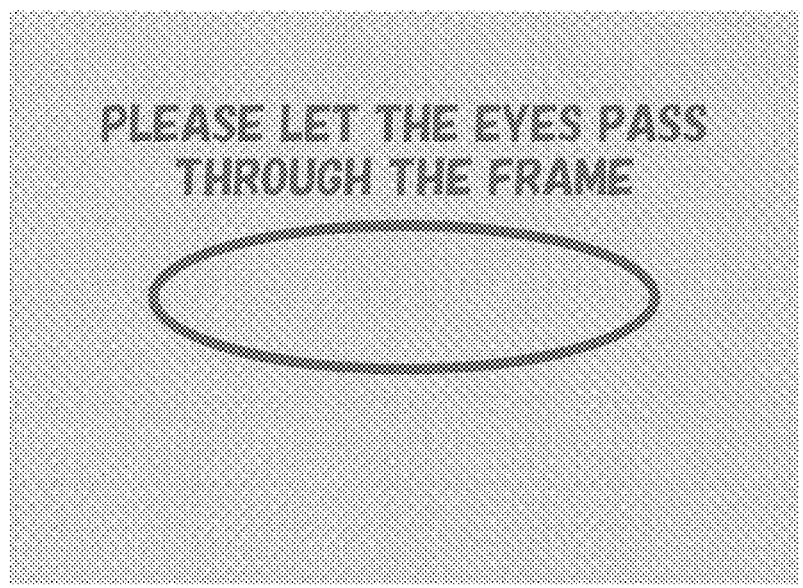
FIG. 9 is an image diagram illustrating an oval frame as an example of the presentation of the imaging area.

FIG. 9 is an image diagram illustrating an oval frame as an example of the presentation of the imaging area. As described above, even when the oval frame is illustrated, the target person 500 can know where to let the eyes pass through, as in the example in FIG. 8.

Figure 10:
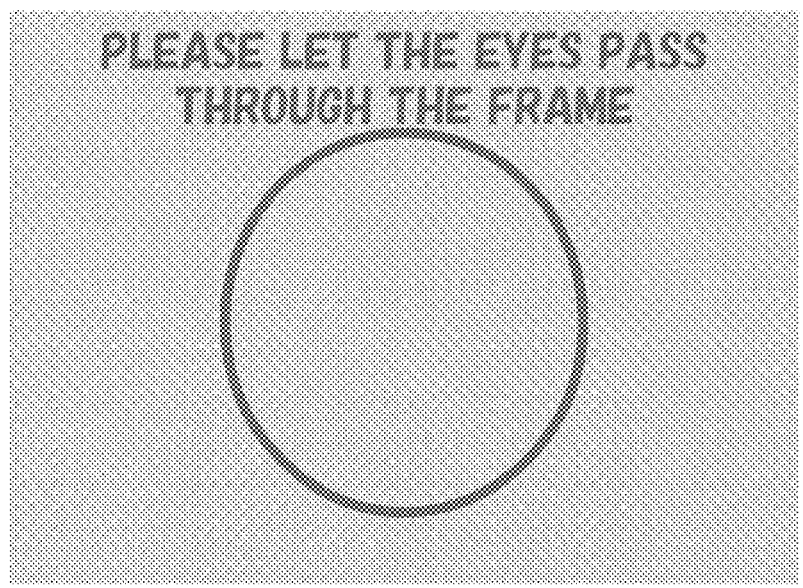
FIG. 10 is an image diagram illustrating a frame corresponding to an outline of a face as an example of the presentation of the imaging area.

FIG. 10 is an image diagram illustrating a frame corresponding to an outline of the face as an example of the presentation of the imaging area. As described above, by displaying the frame corresponding to the outline of the face, the target person 500 can know where to let the face pass through. In this case, as a result of the movement of the target person 500 to let the face pass through the frame, the eyes of the target person 500 passes through the imaging area. A display position of the frame may be set on the basis of the relationship between the position of the eyes and the face area.

Figure 11:
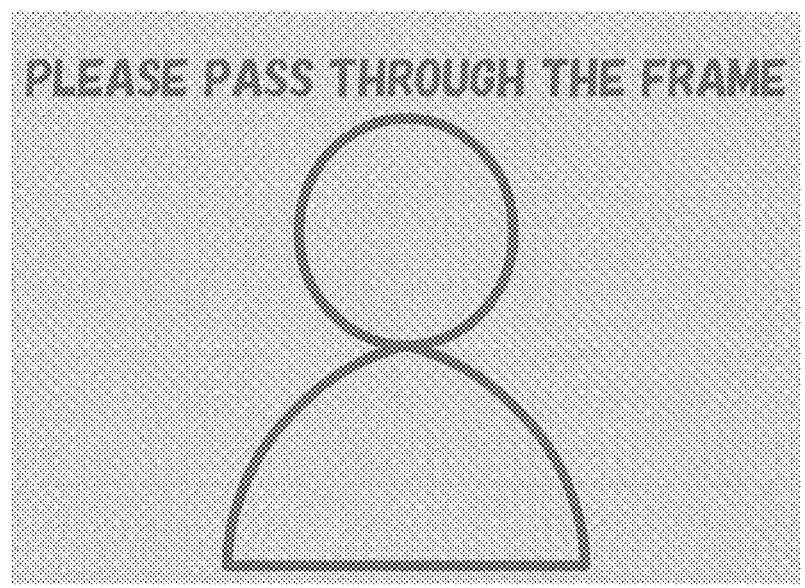
FIG. 11 is an image diagram illustrating a frame corresponding to an outline of an upper body as an example of the presentation of the imaging area.

FIG. 11 is an image diagram illustrating a frame corresponding to an outline of an upper body as an example of the presentation of the imaging area. As descried above, by displaying the frame corresponding to the outline of the upper body, the target person 500 can know where to let the upper body pass through. In this case, as a result of the movement of the target person 500 to let the upper body pass through the frame, the eyes of the target person 500 passes through the imaging area. The display position of the frame may be set on the basis of the relationship between the position of the eyes and an area of the upper body.

Figure 12:
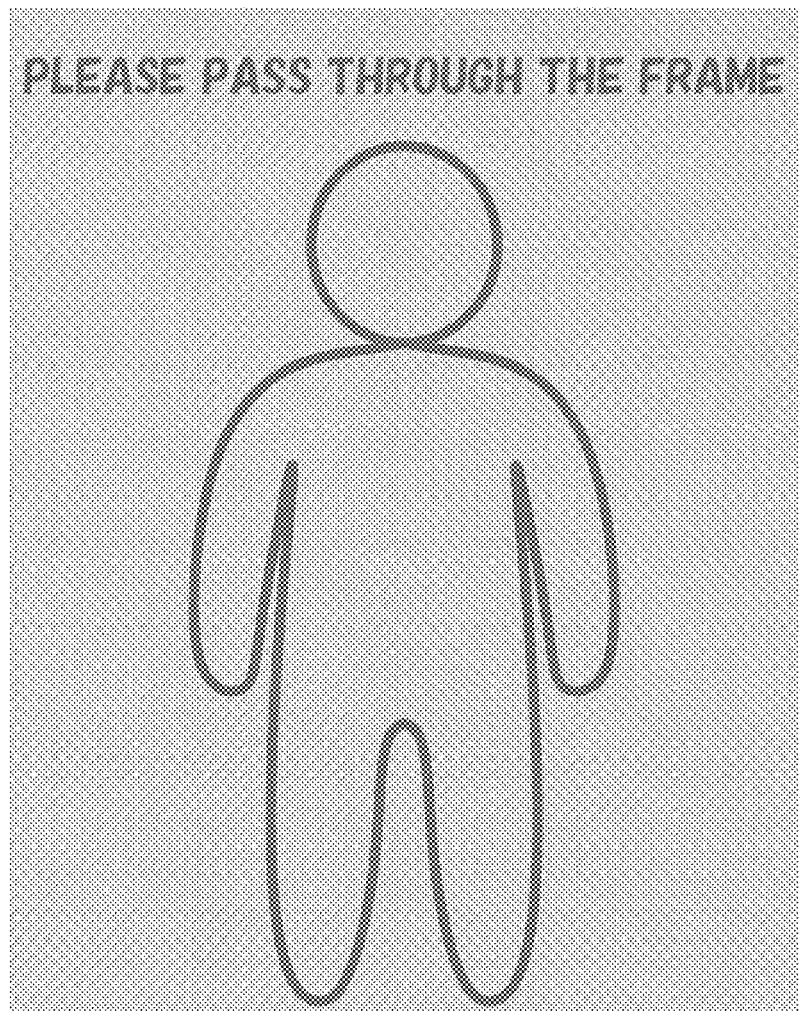
FIG. 12 is an image diagram illustrating a frame corresponding to an outline of a whole body as an example of the presentation of the imaging area.

FIG. 12 is an image diagram illustrating a frame corresponding to an outline of a whole body as an example of the presentation of the imaging area. As descried above, by displaying the frame corresponding to the outline of the whole body, the target person 500 can know where to let his or her body pass through. In this case, as a result of the movement of the target person 500 to let the body pass through the frame, the eyes of the target person 500 passes through the imaging area. The display position of the frame may be set on the basis of the relationship between the position of the eyes and an area of the whole body.

In the display of the outline as illustrated in FIG. 10 to FIG. 12, an outline selected from templates prepared in advance may be utilized, or an outline estimated from the image of the target person 500 may be utilized.

Figure 13:
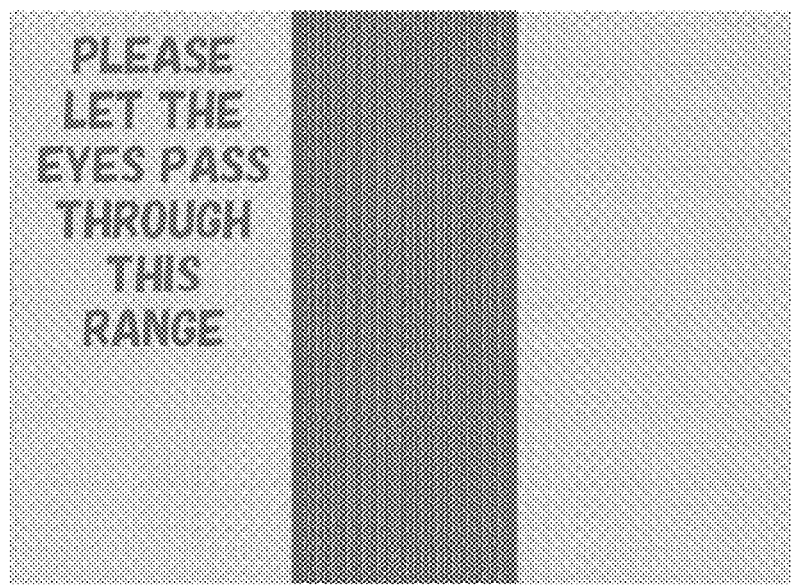
FIG. 13 is an image diagram illustrating a range corresponding to a width of an area as an example of the presentation of the imaging area.

FIG. 13 is an image diagram illustrating a range corresponding to a width of an area as an example of the presentation of the imaging area. In such a display, the target person 500 can smoothly adjust the position of the eyes when the adjustment of the position of the eyes is required only horizontally. Specifically, since the target person 500 only needs to be aware of a lateral position (in other words, the target person 500 does not need to be aware of a longitudinal position), a load required for the adjustment is reduced.

Figure 14:
FIG. 14 is an image diagram illustrating a range corresponding to a longitudinal length of the area as an example of the presentation of the imaging area.

FIG. 14 is an image diagram illustrating a range corresponding to a longitudinal length of the area as an example of the presentation of the imaging area. In such a display, the target person 500 can smoothly adjust the position of the eyes when the adjustment of the position of the eyes is required only vertically. Specifically, since the target person 500 only needs to be aware of a vertical position (in other words, the target person 500 does not need to be aware of a horizontal position), the load required for the adjustment is reduced.

Technical Effect

Next, a technical effect obtained by the authentication system 1 according to the example embodiment will be described.

As described in FIG. 1 to FIG. 14, in the authentication system 1 according to the example embodiment, the information about the imaging area is presented at the position that allows an overlap of the target person 500 by the information presenting system 10. More specifically, the display is performed such that the position of the biological part to be imaged to be used in the biometric authentication overlaps the information about the imaging area. By this, it is possible to guide the target person 500 to an appropriate position and to appropriately obtain the image of the biological part used for the biometric authentication. Such a technical effect is noticeably demonstrated in an authentication process performed when the target person 500 moves (e.g., an authentication process in which it is too late to focus in response to the movement of the target person 500) such as, for example, walk-through authentication. Specifically, since the target person knows the position of the imaging area and moves to an appropriate position, it is possible to obtain an image suitable for the authentication process without adjusting the imaging area on a system side.

The above-described example embodiment describes an example in which the fog generating apparatus 32 is used as the display apparatus 30; however, it is also possible to adopt an apparatus other than the fog generating apparatus 32 as long as the display can be performed at the position that allows an overlap of the target person 500.

Modified Example 1

In the example embodiment described above, the imaging area is projected on the fog display 33, but instead of projecting the imaging area, the width of the fog display 33 generated by the fog generating apparatus 32 may be adjusted. In this instance, the fog generating apparatus 32 receives the information about the imaging area from the information presenting system 10. The fog generating apparatus 32 adjusts the width of the fog display 33 on the basis of the received information about the imaging area. Here, the width of the fog display 33 after the adjustment may be a width that matches a width of the imaging area, or a width that matches a width of the body of the target person 500. The target person 500 can intuitively know the width of the imaging area by visually recognizing the fog display 33 with the width adjusted. Alternatively, the target person may be informed by display or audio that the width of the fog display 33 corresponds to the width of the imaging area. In this manner, the target person 500 passes through the fog display 33 by adjusting his or her position such that an eye area passes through the fog display 33 with the width adjusted.

Even when the fog generating apparatus 32 does not receive the information about the imaging area, it is possible to adjust the width of the fog display 33. For example, a control unit that controls the fog generating apparatus 32 receives the information about the imaging area from the information presenting system 10, and the control unit controls the fog generating apparatus 32 in accordance with the information about the imaging area, so that the width of the fog display 33 may be adjusted.

Modified Example 2

The authentication system 1 may include a gate through which the target person 500 passes when the authentication succeeds. The gate is closed such that the target person 500 cannot pass through until the authentication succeeds. When the authentication succeeds, the gate is opened to allow the target person 500 to pass through. The gate may be configured to be always open and to be closed when the authentication fails.

Furthermore, information indicating that the authentication of another target person cannot be performed (e.g., a mark or a sentence indicating that another target person cannot pass through or that the authentication process cannot be performed) may be projected on the fog display 33 from when the imaging of the eye area of the target person 500 is completed to when the target person 500 passes through the gate.

Modified Example 3

In addition to the example embodiment described above, the authentication system 1 may include a camera and a sensor for detecting tailgating and lost articles. In this case, the information presenting system 10 projects an image or a sentence indicating the tailgating and the presence of lost articles, on the fog display 33 on the basis of a detection result.

SUPPLEMENTARY NOTES

The example embodiment described above may be further described as, but not limited to, the following Supplementary Notes.

Supplementary Note 1

An information presenting system described in Supplementary Note 1 is an information presenting system including: a specification unit that specifies a position of a biological part used for authentication from information about a target person; a setting unit that sets an imaging area in which the biological part is imaged, in accordance with the specified position of the biological part; and a presentation unit that presents information indicating the imaging area at a position that allows an overlap of the biological part.

Supplementary Note 2

An information presenting system described in Supplementary Note 2 is the information presenting system described in Supplementary Note 1, wherein the presentation unit presents the information indicating the imaging area at a position through which the target person can pass.

Supplementary Note 3

An information presenting system described in Supplementary Note 3 is the information presenting system described in Supplementary Note 2, wherein the presentation unit presents the information indicating the imaging area by projection on a fog display.

Supplementary Note 4

An information presenting system described in Supplementary Note 4 is the information presenting system described in any one of Supplementary Notes 1 to 3, wherein the presentation unit presents the information indicating the imaging area in the vicinity of a focus position of an image unit that captures the imaging area.

Supplementary Note 5

An information presenting system described in Supplementary Note 5 is the information presenting system described in any one of Supplementary Notes 1 to 4, wherein the specification unit specifies the position of the biological part by using an image of the target person.

Supplementary Note 6

An information presenting system described in Supplementary Note 6 is the information presenting system described in Supplementary Note 5, wherein the specification unit detects a face area including a face of the target person from the image of the target person and specifies the position of the biological part.

Supplementary Note 7

An information presenting system described in Supplementary Note 7 is the information presenting system described in any one of Supplementary Notes 1 to 6, wherein the specification unit specifies the position of eyes used for iris authentication, as the position of the biological part.

Supplementary Note 8

An information presenting method described in Supplementary Note 8 is an information presenting method including: specifying a position of a biological part used for authentication from information about a target person; setting an imaging area in which the biological part is imaged, in accordance with the specified position of the biological part; and presenting information indicating the imaging area at a position that overlaps the biological part.

Supplementary Note 9

A computer program described in Supplementary Note 9 is a computer program that operates a computer: to specify a position of a biological part used for authentication from information about a target person; to set an imaging area in which the biological part is imaged, in accordance with the specified position of the biological part; and to present information indicating the imaging area at a position that overlaps the biological part.

Supplementary Note 10

An authentication system described in Supplementary Note 10 is an authentication system including: a specification unit that specifies a position of a biological part used for authentication from information about a target person; a setting unit that sets an imaging area in which the biological part is imaged, in accordance with the specified position of the biological part; a presentation unit that presents information indicating the imaging area at a position that allows an overlap of the biological part; an imaging unit that images the imaging area and obtains an image of the biological part; and an authentication unit that performs the authentication of the target person on the basis of the image of biological part.

This disclosure is not limited to the examples described above and is allowed to be changed, if desired, without departing from the essence or spirit of this disclosure which can be read from the claims and the entire specification. An information presenting system, an information presenting method, a computer program, and an authentication system with such modifications are also intended to be within the technical scope of this disclosure.

DESCRIPTION OF REFERENCE CODES

1 Authentication systems
10 Information presenting system
20 Detection apparatus
30 Display apparatus
31 Projection apparatus
32 Fog generating apparatus
33 Fog display
40 Imaging apparatus
50 Authentication apparatus
101 Position specifying unit
102 Area setting unit
103 Information output unit
500 Target person

What is claimed is:

1. An information presenting system comprising:
at least one memory storing instructions; and
at least one processor that is configured to execute the instructions to:
  specify a position of a biological part used for authentication from information about a moving target person;
  set an imaging area in which the biological part is imaged, in accordance with the specified position of the biological part;
  present information indicating the imaging area at a position on a medium through which the target person can pass that allows an overlap of the biological part; and
  control an imaging unit so that an image of the biological part is captured when the biological part passes through the imaging area.

2. The information presenting system according to claim 1, wherein the at least one processor presents the information indicating the imaging area at a position through which the target person can pass.

3. The information presenting system according to claim 2, wherein the at least one processor presents the information indicating the imaging area by projection on a fog display.

4. The information presenting system according to claim 1, wherein the at least one processor presents the information indicating the imaging area in the vicinity of a focus position of the imaging unit that captures the imaging area.

5. The information presenting system according to claim 1, wherein the at least one processor specifies the position of the biological part by using an image of the target person.

6. The information presenting system according to claim 5, wherein the at least one processor detects a face area including a face of the target person from the image of the target person and specifies the position of the biological part.

7. The information presenting system according to claim 1, wherein the at least one processor specifies the position of eyes used for iris authentication, as the position of the biological part.

8. The information presenting system according to claim 1, wherein the at least one processor adjusts a width of a fog display to match a width of the imaging area to present the information indicating the imaging area.

9. The information presenting system according to claim 8, wherein the at least one processor displays on the fog display that the width of the fog display corresponds to the width of the imaging area.

10. The information presenting system according to claim 8, wherein the at least one processor presents by audio that the width of the fog display corresponds to the width of the imaging area.

11. An information presenting method performed by a computer and comprising:
specifying a position of a biological part used for authentication from information about a moving target person;
setting an imaging area in which the biological part is imaged, in accordance with the specified position of the biological part;
presenting information indicating the imaging area at a position on a medium through which the target person can pass that allows an overlap of the biological part; and
controlling an imaging unit so that an image of the biological part is captured when the biological part passes through the imaging area.

12. A non-transitory recording medium storing a computer program executable by a computer to perform an information presenting method comprising:
specifying a position of a biological part used for authentication from information about a moving target person;
setting an imaging area in which the biological part is imaged, in accordance with the specified position of the biological part;
presenting information indicating the imaging area at a position on a medium through which the target person can pass that allows an overlap of the biological part; and
controlling an imaging unit so that an image of the biological part is captured when the biological part passes through the imaging area.

* * * * *